2 Sheets—Sheet 1.

J. ARKELL, B. & A. SMITH.

Paper Bag.

No. 8,202. Reissued April 30, 1878.

*Witnesses:*

E. Wolff

Jacob Felbel

*Inventors:*

James Arkell, Benj. Smith and Adam Smith

By their attorney

J. N. McJulie

J. ARKELL, B. & A. SMITH.

Paper Bag.

No. 8,202. Reissued April 30, 1878.

Witnesses:

E. Wolff.

Jacob Felbel

Inventors:

James Arkell, Benj. Smith and Adam Smith

By their atty.

J. N. McIntire

UNITED STATES PATENT OFFICE.

JAMES ARKELL, BENJAMIN SMITH, AND ADAM SMITH, OF CANAJOHARIE, NEW YORK.

IMPROVEMENT IN PAPER BAGS.

Specification forming part of Letters Patent No. 47,376, dated April 25, 1865; Reissue No. 4,749, dated February 13, 1872; Reissue No. 8,202, dated April 30, 1878; application filed March 8, 1878.

*To all whom it may concern:*

Be it known that we, JAMES ARKELL, BENJAMIN SMITH, and ADAM SMITH, of Canajoharie, Montgomery county, State of New York, have invented an Improvement in and a new Mode of Making Paper Bags; and we do hereby declare the following to be a full, clear, and exact description thereof, reference being had to the accompanying drawings and the letters of reference marked thereon.

Figure 1:
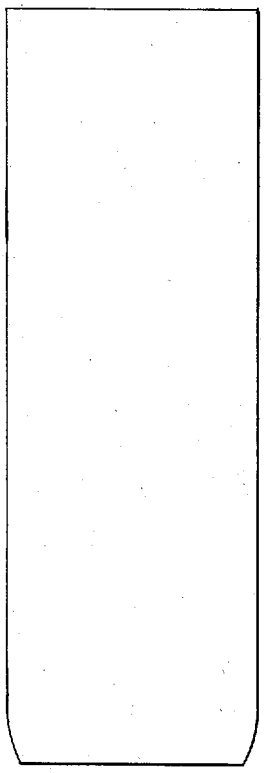
Figure 2:
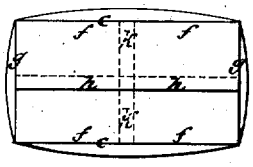
Figure 6:
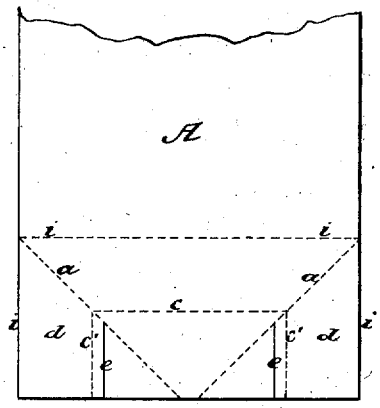
Figure 7:
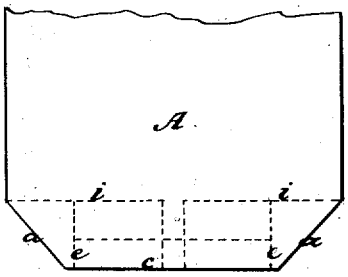
Figure 8:
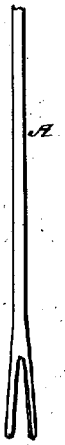
Figure 6:
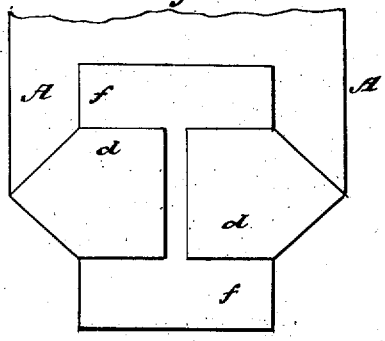

In the accompanying drawing, Figure 1 is a side view of one of our improved bags made according to our new mode or method of manufacture, and illustrated as filled or distended. Fig. 2 is a bottom view of the same. Figs. 3, 4, 5, 6, 6* are a series of views or diagrams, illustrating the new process or method by which we form satchel or square bottomed bags. Fig. 7 is a side view of the lower part of a finished bag, folded over for packing or transportation, empty; and Fig. 8 is an edge view of the same.

In the several figures the same part or portion will be found designated by the same letter of reference.

Our invention relates to an improvement in and a novel mode or method of making that kind of bags which have a square or satchel bottom—*i. e.*, a bottom rectangular in contour, in contradistinction to that kind of bag which is formed by merely pasting or closing up one end of a flattened tube of paper or other material; and consists, first, in a novel form or structure of the bottom of this kind of bag; and, secondly, in a novel method of making square-bottomed bags, in which the folding and pasting of the material to form the bottom are done while the prepared tube or body lies wholly or partially on a table, and without the use of any block or former, as will be hereinafter more fully explained.

It has been customary previous to our invention to fold and form the bottoms of satchel-bottom bags over a "former;" but this mode or process of manufacture is necessarily slow, and consequently expensive in comparison with our new system, by which the material of the body can be so folded on a table or plain surface that when distended or opened out it shall present the requisite form or shape; and it has been suggested to make satchel-bottom bags by placing the bag-blank—that is, the flattened paper tube—in a lotted or clamping table or other contrivance, in which the blank is held in a vertical position, with a sufficient portion protruding above the table for the formation of a bottom, and then bending or breaking down the upwardly-projecting end of the flattened tubular blank onto the table-like surface, the clamping-jaws of the machine serving as the means for determining the point down to which the stock shall be tucked or folded in, and there pasting together the folded-over portions; but in this previously-known method of making square-bottom bags the end of the flattened tubular blank was not subjected to any preliminary treatment or operation tending to facilitate a rapid breaking down or tucking in of the stock in proper shape to form the bag-bottom, and the broken-down or tucked-in portions of the upwardly-projecting tubular blank were folded so as to overlap each other, and had these overlapping portions pasted together, so as to form, primarily, a sort of grocer's bag, and the corners of the folded-down and pasted bottom were then folded over in opposite directions and pasted to the previously folded and pasted portions. This method or process of forming a square-bottom bag not only necessitated a double pasting operation of the material, one pasting to first fasten together the overlapped edges of the tubular blank, and a second pasting to secure in place separately each of the subsequently folded-over corners, and a great expenditure of time and labor to effect the breaking down and tucking in of the stock in proper shape to insure a reasonable degree of perfection of form in the finished bottom, but involved an unnecessary consumption of stock, thus increasing the cost of manufacture very largely over the cost in material of bags made from tubular blanks over a former or block.

By the second part of our invention we are enabled to manufacture square-bottom bags by a method or process in which are combined greater economy of material and greater economy of time and labor than are to be found combined in any previously-known mode or method of manufacture, while by the first part of our invention we are enabled to provide for use a bag the square bottom of which is novel in structure and of a construction superior to any of those made heretofore.

Figure 3:
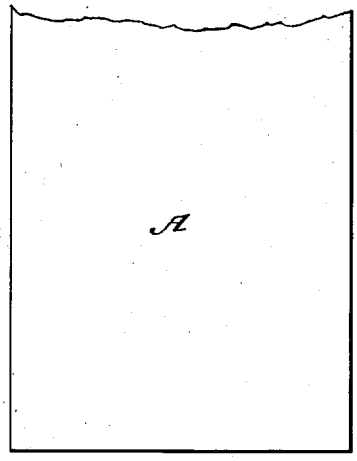
Figure 4:
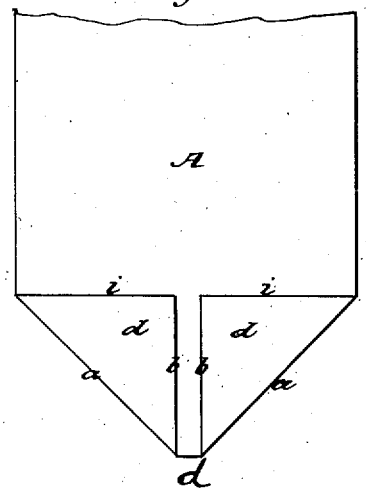
Figure 5:
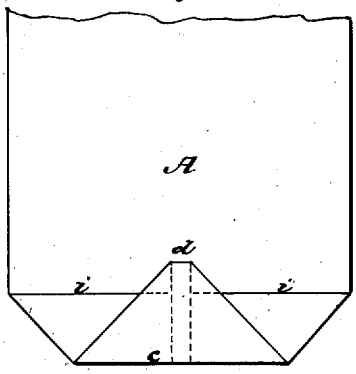

To make a square-bottom bag according to our new method or process of manufacture, and also involving our improvement in the structure of the bottom, we take the paper or other material previously folded and pasted into a flattened tubular blank, or like the body of a sack or bag flattened, as illustrated, for instance, at Fig. 3, (where enough of one of such tubes or bag-bodies is shown to illustrate the method of forming the bottom of a bag,) and, laying it on a table, we fold over the corners of the flattened tube or body A in about the manner seen at Fig. 4, and so that the flaps or folded-over portions *d* shall nearly or quite meet at the edges *b b*. When these flaps *d d* are unfolded again, creases or fold-marks will be left at the lines *a a;* but before unfolding them we make another fold in the material by doubling it over, as seen at Fig. 5, and so that the material shall receive additional creases at the line *c* and otherwise, as will be presently explained. This last fold may now be taken out and the material folded over at about the edges *i i*, so as to make a crease or fold-mark at this point. The flaps *d d* are now unfolded, and the body presents the fold-marks or crease indicated by the dotted lines at Fig. 6. Two cuts, *e e*, are now made, either in or near the creases *c'*, and the portions *d d* are now tucked or folded in, so that the body will look as seen at Fig. 6*, after which the portions *f* may be folded over onto the parts *d d* and pasted, when the bottom will be completed, and the bag will present, when distended, the appearance seen at Figs. 1 and 2, and, when folded or flattened out for packing or transportation, the appearance seen at Figs. 7 and 8.

It will be understood that when the corners or portions *d d* are folded over to quite meet at the edges *b b* (in lieu of nearly meeting, as seen at Fig. 4) there will be no single-thickness portion left, as at *k*, Fig. 2, no portion of the bottom being of less than two thicknesses of material; and it will be understood that it is not essential, in carrying out the second part of our invention, to make the cuts *e e*, though we have employed these cuts in practicing this part of our invention because thereby the bottom of the bag thus presents four rectangular flaps, as seen at Fig. 2, is readily pasted, is strong, and is neat in appearance, involving the peculiar and desirable construction constituting the first part of our invention.

It will be seen that by our new method or process of forming square-bottom bags by breaking down or tucking in and folding down onto itself the end of the tubular blank, and then simply overlapping in opposite directions and pasting onto itself parts of the broken-down portions of the blank, a square bottom is produced with less stock and labor than are necessary in any previously-known method of forming a square bottom without a former, and with less labor and expense than a square-bottom bag can be made by distending the blank over a former or block, and thereon breaking down, folding, and pasting together the stock.

By making the preliminary folds and creases in the manner shown and described the folding and pasting into shape of the stock to form the square bottom is facilitated, and the bags may be made with great similarity; and by the introduction of the cuts *e e* in practicing our new process of making square-bottom bags, we are enabled to provide a satchel-bottom bag in which the bottom, when the bag is distended or filled, will have its several plies or thicknesses of stock distributed in rectangular portions, as shown, and which will be strong and neat in appearance, while at the same time the stock will be folded and pasted so as to insure tightness of the joints or seams and perfection in the finished bag.

Of course, the improved bag-bottom made the subject of the first part of our invention may be produced by some other process or method of manufacture than that forming the second part of our invention, just as our new method or process of making square-bottom bags may be employed to produce square-bottom bags different in structure from the bag shown herein; and in practicing the second part of our invention other means than the well-known and described creasing or folding to form guide-marks may, of course, be adopted as a preliminary to facilitate the subsequent bottom-forming operations and insure comparative similarity in all the bags made from blanks of uniform size, without departing from the spirit of this part of our invention, the gist of which rests in having the paper composing the flattened tubular bag-blank subjected to a preliminary treatment or operation, the effect of which is to insure the subsequent breaking down or folding in of the stock at the proper points, and then breaking down or tucking in the stock of the tubular blank and folding it down onto itself and pasting it, substantially as specified.

Having now shown and described both our new process or method of forming square-bottom bags, by which we are enabled, without the use of any former, and with an economical use of stock, to fold and perfectly close up the end of the tubular blank, and also our improved construction of bag-bottom, whereby we are enabled to provide for use a satchel-bottom bag such as already described, what we claim as of our invention, and desire to secure by Letters Patent, is—

1. A satchel-bottom bag the several thicknesses of the bottom of which are so formed and disposed in the structure of the bag as to present each a substantially rectangular contour, as shown and described.

2. The described method of forming the bottom of a satchel-bottom bag or sack, consisting, essentially, in breaking down or tucking in and folding over and pasting up the end of the tubular blank in substantial conformity to creases or guide-marks previously formed in or made on the paper composing the flattened tubular bag-blank.

In testimony whereof we have hereunto set our hands and seals this 21st day of February, 1878.

JAMES ARKELL. [L. S.]
BENJAMIN SMITH. [L. S.]
ADAM SMITH. [L. S.]

In presence of—
H. ARKELL,
W. N. SMITH.